FIP8102 OR 3,550,000
Dec. 22, 1970 H. G. GRILK 3,550,000
DUAL DIRECTION LINEAR AMPLIFIER
Filed April 12, 1968
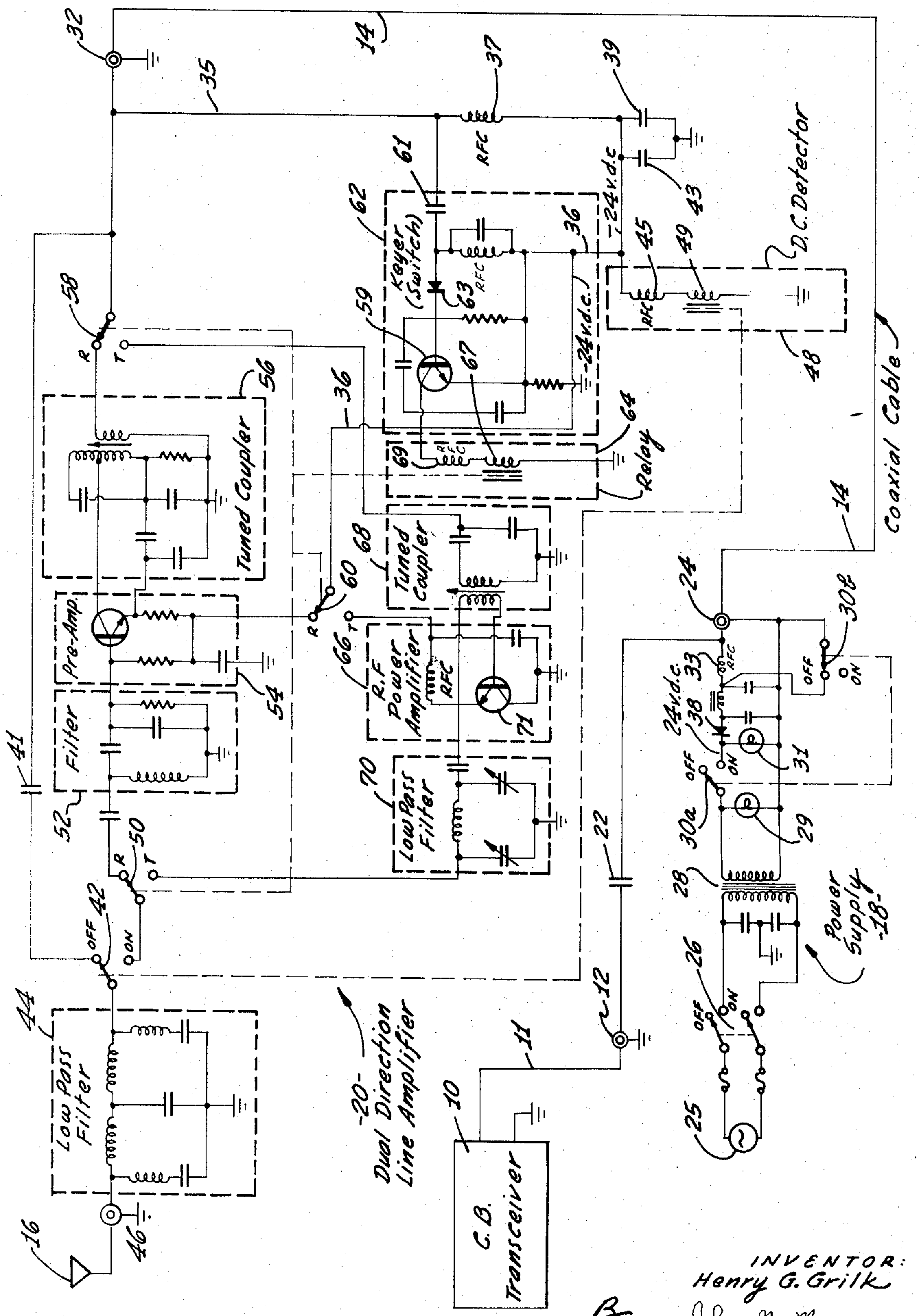
INVENTOR:
Henry G. Grilk
John J. Mesaros
ATTORNEY 3,550,000

DUAL DIRECTION LINEAR AMPLIFIER

Henry G. Grilk, Clifton, N.J., assignor to Litton Precision Products, Morris Plains, N.J., a corporation of Delaware Filed Apr. 12, 1968, Ser. No. 721,031
Int. Cl. H04b *1/48*
U.S. Cl. 325—15 7 Claims

ABSTRACT OF THE DISCLOSURE

A dual direction amplifier mounted in close proximity to an antenna of a conventional citizens band transceiver, and being supplied with operating power from a power source located at the transceiver, the amplifier having means for amplifying signals transmitted from the remotely located transmitter section of the CB transceiver, means for preamplifying incoming signals from the antenna, means for differentiating between the transmitted signals from the transmitter and incoming signals from the antenna and means responsive to the differentiating means for activating one of said incoming amplifier means and said signal transmitting amplifier means. The dual direction amplifier is transistorized with a positive ground to enable a transistor heat sink to be mounted directly to the chassis to thereby permit the chassis to function as part of the heat dissipating heat sink.

BACKGROUND OF THE INVENTION

Citizens band radio communications is increasing in popularity due to the fact that an examination for a license from the Federal Communications Commission is not required. Furthermore, a moderate investment is all that is required. However the CB transceiver is restricted by the FCC with regards to input and output power levels. The FCC requires that the maximum legal input power to the final amplifier in the transmitter is five watts. The maximum legal output power from the final amplifier is four watts. Thus the theoretical legal efficiency is 80%. However, due to varying coaxial cable lengths with attendant transmission line losses the actual power transmitted from the antenna will vary over a wide range depending on these losses. The "final output amplifier" is the amplifier at the transmitting section of the transceiver which is located remotely from the antenna at the "shack."

If, however, the "final output amplifier" were to be located at the antenna, then the power levels at the antenna could be equalized, regardless of the length of the coaxial cable.

Accordingly it is an object of the present invention to provide a new and improved dual direction linear amplifier located at the antenna.

It is another object of this invention to provide a new and improved dual direction linear amplifier with provision for amplifying the transmitted signal and preamplifying the incoming signal from the antenna.

It is a further object of this invention to provide a new and improved dual direction linear amplifier with means to detect the relative power levels between incoming and transmitted signals.

It is still another object of this invention to provide a new and improved dual direction linear amplifier with means responsive to the detection means for selectively switching the transmitter amplifier or receiver preamplifier into its operative condition.

It is still a further object of this invention to provide a new and improved dual direction linear amplifier having the power supply therefor remote from the antenna at the "shack."

SUMMARY OF THE INVENTION

The foregoing and other objects of the invention are accomplished by providing a dual direction linear amplifier unit which includes the "final output amplifier" amplifying the transmitted RF signals and a preamplifier for amplifying the incoming RF signals from the antenna. The unit is located in close proximity to the antenna with the power for the unit being provided from the "shack" at a location remote from the antenna, over the existing coaxial cable. Provision is made within the unit for detecting the relative power differences between the transmitted signals and the received signals to selectively energize either the transmitter amplifier or the incoming signal preamplifier. A protective bypass circuit is provided in the event of failure of power to the unit, the bypass circuit providing the conventional type operation between the CB transceiver and the antenna.

The final amplifier used in the unit is a low-power Class B amplifier with a theoretical efficiency of approximately 56%. With the maximum five watt input power to the final amplifier the output power would measure approximately 2.8 watts. In normal CB equipment the output power delivered to the antenna is only 1 watt or less due to the cable losses.

DESCRIPTION OF THE DRAWING

A more detailed explanation of the invention is provided by reference to the following specification when taken in conjunction with the drawing in which the sole figure is a schematic diagram of the dual direction linear amplifier according to the invention.

DESCRIPTION OF THE PREFERRED EMBODIMENT

Referring now to the drawing, there is shown a citizens band transceiver 10 having contained therein the conventional transmitting section and receiving sections. In conventional citizen band transmission setups, a coaxial cable connects the transceiver 10 to an antenna 16 with the length of the coaxial cable 14 depending on the distance between the antenna 16 and the transceiver 10. The length of the cable would determine the amount of power losses and consequently the reduction in power output at the antenna for transmitted signals and the reduction in power at the transceiver for incoming signals from the antenna. In accordance with the present invention, a power supply 18 and a dual direction linear amplifier generally designated 20 are interjected into the circuit between the CB transceiver 10 and the antenna 16 with the dual direction line amplifier 20 being located in close proximity to the antenna 16 while the power supply 18 is located adjacent the CB transceiver 10 at the radio "shack." Electrical interconnection is accomplished by use of the existing coaxial cable 14. In the embodiment illustrated, the power supply is provided with coaxial cable connectors 12 and 24 while the line amplifier 20 is provided with coaxial cable connectors 32 and 46 for the purpose of ready connection at appropriate points through existing cables.

The power supply 18 is electrically connected to the transceiver 10 by means of a coaxial cable 11 at connector 12. Connectors 12 and 24 are interconnected by means of a high-pass capacitor 22. Operating power is supplied from a suitable AC line source 25 through an on/off switch 26 to the primary of a step down transformer 28 where the power is stepped down from the conventional 110 volt AC to 24 volt AC. With switch 26 closed a voltage appears at the secondary of transformer 28 which voltage is indicated by a suitable panel light 29 connected in parallel with the secondary of transformer 28. A second switch 30*a* is connected in series with the secondary winding of transformer 28, the actuation of which will be indicated by a second panel light 31 which is connected in parallel with the first panel light 29 after switch 30 is closed. At this point, the 24 volts AC is rectified by diode 38 producing —24 volts DC. This is then filtered by an L-C and choke section and appears at connector 24 preferably mounted on the power supply cabinet. A radio frequency choke coil 33 is connected in series between switch 30*a* and connector 24. Accordingly, it can be seen that RF power is blocked from the power supply 18 by choke 33 while DC power is prevented from feeding back to the transceiver 10 by the presence of the high-pass capacitor 22. Consequently with the transceiver 10 in its energized condition and switches 26 and 30*a* of power supply 18 in their "on" condition the coaxial cable 14 will conduct the radio frequencies as well as the DC power to the connector 32 of the dual direction linear amplifier 20.

The second switch includes a second pole 30*b* which is normally closed and shorts the DC supply when in the "off" position. This discharges all power supply electrolytic capacitors instantaneously.

The dual direction linear amplifier 20 has the circuit configuration shown in block form according to function while each block shows a schematic of the circuitry employed to accomplish the function. The circuitry will be discussed in block diagram form first with elaboration of the functions occurring hereinafter.

The contacts shown in the figure are shown in their normal condition, that is, with the power supply 18 deenergized. Contact 42 has its normally closed contact designated "off" and its normally open contact designated "on." The designation "off" and "on" relates to the condition of the dual direction linear amplifier 20. Contacts 50, 58 and 60 have their normally closed contacts designated with a "R" for receive while the normally open contacts are designated "T" for transmit.

With the contacts in their normally closed condition as shown in the drawing, it can be seen that there is a completed circuit between the transceiver 10 and the antenna 16 which circuit is through coaxial cable 11 through capacitor 22 through coaxial cable 14 through connector 32 through condensor 41 over normally closed relay contact 42 (designated "off") through low-pass filter 44 through the connector 46 to the antenna 16. This circuit is a by-pass circuit which can be used for transmitting or receiving in a conventional manner.

The DC power is conducted over conductor 35 through a radio frequency choke 37 to the parallel connected capacitors 39 and 43 to ground. Conductor 36 which carries the DC power to other components of the circuit is connected at a paint intermediate capacitor 39 and radio frequency choke 37. A DC voltage detector 48 is connected between conductor 36 and ground, the detector 48 including a series circuit of a radio frequency choke 45, and the coil of a relay 49. The choke 45 prevents any radio frequency energy from getting onto the DC supply line and reduces the capacitance effect of the relay structure on the RF circuitry. With the DC voltage present at conductor 36, relay 49 is energized to actuate its contacts 42 to the "on" condition thereby removing the by-pass circuit including capacitor 41 and permitting operation of the linear amplifier 20 in either a "transmit" or "receive" condition according to that which is desired.

At this point the dual direction linear amplifier 20 is in condition for receiving signals from antenna 16 through jack 46 through low-pass filter 44 through "on" contact 42 through contact 50R through a filter 52, a preamplifier 54, a tuned coupler 56 through contact 58R through connector 32 and through the coaxial cable 14 back to the CB transceiver 10. The preamplifier 54 receives its DC power from conductor 36 over contacts 60R to the preamplifier.

When the transceiver 10 is energized to its transmitting condition, relatively high-level radio frequency power appears at connector 32 which power is detected by keyer switch 62 connected in series with connector 32 and in series with a relay 64 to ground. DC power for the keyer switch 62 is provided from conductor 36. An NPN transistor 59 is included within keyer 62 and is so biased to be a non-conductive with the collector thereof positive with respect to the base. A series circuit exists from connector 32 over conductor 35 through capacitor 61 through diode 63 to the base of transistor 59. The capacitor 61 blocks the DC power but permits the passage of radio frequency energy. If a signal is being transmitted from transceiver 10, the signal is sampled by capacitor 61 and detected by diode 63 which is connected with its cathode at the base of transistor 59, thereby applying the voltage at the base of transistor 59 to render the transistor conductive. With relay 64 connected in the collector to emitter circuit of transistor 59, current will then flow from ground through winding 67 of relay 64 through radio frequency choke 69 from the collector to the emitter of transistor 59 to conductor 36. With relay winding 67 energized relay contacts 50, 58 and 60 are actuated to the "transmit" condition. Conductor 36 having the DC power level of —24 volts is then disconnected from the preamplifier 54 and applied to the RF power amplifier 66 through contact 60T. The receiver preamplifier section is then removed from the linear amplifier 20 and the RF power amplifier sections are placed in circuit.

Thus, the transmitted signal appearing at connector 32 will pass through contact 58T through a tuned coupler 68 through RF power amplifier 66 through low-pass filter 70 through contact 50T through "on" contact 42 through low-pass filter 44 through connector 46 to the antenna 16.

Transistor 59 and keyer 62 is so biased that incoming RF signals from the antenna through the preamplifier 54 are of insufficient voltage magnitude to drive the base of transistor 59 sufficiently positive to render transistor 59 conductive. Accordingly, with appropriate selection of biasing components, the keyer 62 will be energized only by high-level RF signals from the transmitter section of the CB transceiver 10.

In the RF power amplifier 66, NPN transistor 71 is operated as a common emitter configuration; that is, the input is applied between the base and the emitter and the output is taken between the emitter and the collector. However, because of the positive ground system, the collector is actually grounded and is attached directly to a large heat sink (not illustrated) which permits the dissipation of heat and allows transistor 71 to operate at high power levels. In turn the heat sink is bolted directly to the metal chassis which permits the chassis to function as a part of the heat sink thus providing more efficient heat dissipation. Consequently, with the common emitter configuration of the final amplifier, the high-power gain of the common emitter circuit can be employed while the positive ground permits the chassis as well as the heat sink to more efficiently dissipate the heat generated, to provide improved performance.

Inasmuch as the remainder of the blocks contain conventional circuitry, a further discussion thereof is deemed unnecessary to a full understanding of the present invention.

As an alternative to the power supply 18 shown, the secondary of transformer 28 can be connected to coaxial cable 14 for the transmission of 60 cycle AC to the unit 20 with a diode located in series with radio frequency choke 37, the diode being connected to provide the required —24 volts DC at conductor 36.

Although there has been shown and described a preferred embodiment, it is to be understood that other adaptations and modifications may be made within the sphere of the invention and the invention is not to be limited thereby.

I claim:

1. A dual directional radio frequency amplifying system for utilization with a transceiver having transmitting and receiving sections, the transceiver being located remote from an antenna associated therewith, said system comprising:

a power source of direct current in proximity to said transceiver;

cable means connected to said transceiver and to said power source for carrying radio frequency and direct current signals;

first amplifying means in proximity to said antenna having an input and output stage for amplifying said radio frequency signals to be transmitted;

second amplifying means in proximity to said antenna having an input and output stage for amplifying said radio frequency signals being received;

means for separating said direct current signals from said radio frequency signals connected to said cable means;

radio frequency differentiating means connected to said cable means;

switching means controlled by said radio frequency differentiating means for connecting said input stage of said first amplifying means to said cable means and connecting said output stage thereof to said antenna, said switching means also connecting said direct current signals from said means for separating said signals to said first amplifying means for powering said first amplifying means;

said switching means alternately connecting said input stage of said second amplifying mean to said antenna means and connecting said output stage thereof to said cable means, said switching means also alternately connecting said direct current signals from said means for separating said signals to said second amplifying means for powering said second amplifying means;

whereby said amplifying system isolates said first amplifying means from the system while receiving and isolates said second amplifying means therefrom while transmitting.

2. The combination according to claim 1, additionally comprising: a by-pass circuit; means responsive to the absence of direct current from said power source connected to said cable means; switch means operated by said means responsive to the absence of direct current for placing said by-pass circuit in series relationship with said cable means and said antenna.

3. The combination according to claim 1 wherein said cable means connected to said transceiver and said power source includes a coaxial cable having a high-pass capacitor between said transceiver and the point of connection of said power source to said cable means and a radio frequency choke in series with said power source between said power source and said point of connection to said cable means whereby direct current signals from said power source are blocked from said transceiver and radio frequency signals are blocked from said power source.

4. The combination according to claim 1 wherein a low-pass filter is connected in series relationship between said first and second amplifying means and said antenna.

5. The combination according to claim 1 wherein said radio frequency differentiating means includes transistorized switch means actuated in response to a threshold level of power of said radio frequency signals equal to the power of the radio frequency signals from said transceiver; said transistorized switch means being adapted to actuate a relay having a plurality of contacts which forms said first mentioned switch means.

6. The combination according to claim 1, wherein said first amplifying means additionally comprises:

a transistor having base, collector and emitter electrodes biased in a common emitter circuit configuration;

a heat sink electrically connected to the collector of said transistor; and a chassis secured in thermal relation with said heat sink whereby said chassis and said heat sink dissipate heat to permit said first amplifying means to operate more efficiently.

7. A dual directional radio frequency amplifying system for utilization with a transceiver having transmitting and receiving sections, the transceiver being located remote from an antenna associated therewith, said system comprising:

a power source of direct current in proximity to said transceiver;

two-wire coaxial cable means;

high-pass capacitor means connecting said two-wire coaxial cable means to said transceiver;

radio frequency choke means connecting said two-wire coaxial cable means to said power source;

said coaxial cable means thus carrying radio frequency and direct current signals;

transmitting amplifying means in proximity to said antenna having an input and output stage for amplifying said radio frequency signals to be transmitted;

receiving amplifying means in proximity to said antenna having an input and output stage for amplifying said radio frequency signals to be received;

means for separating said direct current signals from said radio frequency signals connected to said coaxial cable means including serially connected radio frequency choke means and capacitor means wherein said direct current signals are separated between said choke and capacitor means;

radio frequency differentiating means connected to said coaxial cable means including high-pass capacitor means blocking said direct current signals;

switching means controlled by said radio frequency differentiating means for connecting said input stage of said transmitting amplifying means to said coaxial cable means and connecting said output stage thereof to said antenna when said transceiver is transmitting, said switching means also connecting said direct current signals from said means for separating said signals to said transmitting amplifying means for powering said amplifying means;

said switching means alternately connecting said input stage of said receiving amplifying means to said antenna means and connecting said output stage thereof to said coaxial cable means when said transceiver is receiving, said switching means also alternately connecting said direct current signals from said means for separating said signals to said receiving amplifying means for powering said amplifying means;

whereby said amplifying system isolates said transmitting amplifying means from the system while receiving and isolates said receiving amplifying means while transmitting and, further said amplifying system is connected between said transceiver and said antenna solely by said two-wire coaxial cable means.

References Cited

UNITED STATES PATENTS

| | | | |
|---|---|---|---|
| 2,327,248 | 8/1943 | Case | 325—21X |
| 2,657,304 | 10/1953 | Parks | 343—178X |
| 2,679,001 | 5/1954 | Tomcik | 325—384 |
| 3,074,024 | 1/1963 | Weidknecht | 330—23 |
| 3,316,487 | 4/1967 | Friedberg et al. | 325—15 |

OTHER REFERENCES

S9, March 1967, pp. 34 and 35.

ROBERT L. GRIFFIN, Primary Examiner

B. V. SAFOUREK, Assistant Exmainer

U.S. Cl. X.R.

325—22; 343—178